(12) United States Patent
Iwata et al.

(10) Patent No.: US 12,104,635 B2
(45) Date of Patent: Oct. 1, 2024

(54) ROOF-MOUNTED ANTENNA MOUNTING STRUCTURE

(71) Applicant: HARADA INDUSTRY CO., LTD., Tokyo (JP)

(72) Inventors: Toshihiro Iwata, Tokyo (JP); Conglin Yang, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 183 days.

(21) Appl. No.: 17/925,304

(22) PCT Filed: Mar. 18, 2021

(86) PCT No.: PCT/JP2021/011216
§ 371 (c)(1),
(2) Date: Nov. 14, 2022

(87) PCT Pub. No.: WO2021/240963
PCT Pub. Date: Dec. 2, 2021

(65) Prior Publication Data
US 2023/0175545 A1    Jun. 8, 2023

(30) Foreign Application Priority Data

May 26, 2020   (JP) ................................ 2020-091088

(51) Int. Cl.
*F16B 37/04*       (2006.01)
*H01Q 1/32*        (2006.01)

(52) U.S. Cl.
CPC ......... *F16B 37/043* (2013.01); *H01Q 1/3275* (2013.01); *F16B 37/04* (2013.01)

(58) Field of Classification Search
CPC ........ F16B 37/04; F16B 37/043; F16B 39/10; F16B 39/24; F16B 43/00; H01Q 1/3275
(Continued)

(56) References Cited

U.S. PATENT DOCUMENTS

| 6,486,841 | B1 | 11/2002 | Mahigashi |
| 8,469,644 | B2 * | 6/2013 | Chang .................... B62K 21/18 411/363 |

(Continued)

FOREIGN PATENT DOCUMENTS

| CN | 106129583 A | 11/2016 |
| EP | 1916737 A1 | 4/2008 |

(Continued)

OTHER PUBLICATIONS

International Search Report in PCT/JP2021/011216, dated May 25, 2021.

*Primary Examiner* — Roberta S Delisle
(74) *Attorney, Agent, or Firm* — Global IP Counselors, LLP

(57) ABSTRACT

A roof-mount antenna mounting structure includes a first threaded part, a second threaded part, a legged washer, a leg opening preventing part and a receiving part. The legged washer has a washer ring having a size smaller than the diameter of a mounting hole of a vehicle roof and a leg part extending from the washer ring and having a plurality of claws that can abut against the vehicle roof. The leg part has such elasticity that it closes once when the legged washer is inserted into the mounting hole of the vehicle roof from the washer ring side and recovers to substantially the original opening state after insertion. The leg opening preventing part has a horizontal part and a vertical part and prevents the leg part from opening at a predetermined angle or more when the claws abut against the vehicle roof.

15 Claims, 9 Drawing Sheets

(58) Field of Classification Search
USPC ........ 411/360, 362, 363, 531, 533, 541, 547
See application file for complete search history.

(56) References Cited

U.S. PATENT DOCUMENTS

| | | | |
|---|---|---|---|
| 8,505,864 B1* | 8/2013 | Taylor | H02S 20/23 |
| | | | 52/173.3 |
| 9,531,319 B2* | 12/2016 | Braunstein | F24S 25/00 |
| 2005/0237248 A1 | 10/2005 | Nakano et al. | |
| 2006/0214860 A1 | 9/2006 | Hayashi et al. | |
| 2011/0267243 A1 | 11/2011 | Steinkamp et al. | |
| 2016/0315379 A1 | 10/2016 | Silva | |
| 2017/0237156 A1* | 8/2017 | Taira | H01Q 1/3275 |
| | | | 343/713 |
| 2018/0309184 A1* | 10/2018 | Iwakami | H01Q 1/1207 |

FOREIGN PATENT DOCUMENTS

| | | |
|---|---|---|
| JP | 2001-036315 A | 2/2001 |
| JP | 2006-248486 A | 9/2006 |
| JP | 2018-131076 A | 8/2018 |
| WO | 2005051720 A1 | 6/2005 |

* cited by examiner

ROOF-MOUNTED ANTENNA MOUNTING STRUCTURE

CROSS-REFERENCE TO RELATED APPLICATIONS

This application is a U.S. national stage application of International Application No. PCT/JP2021/011216, filed on Mar. 18, 2021. This application claims priority to Japanese Patent Application No. 2020-091088, filed on May 26, 2020. The entire disclosure of Japanese Patent Application No. 2020-091088 is hereby incorporated herein by reference

BACKGROUND

Technical Field

The present invention relates to a roof-mount antenna mounting structure, and more particularly to a roof-mount antenna mounting structure for an antenna which is inserted into and fixed to a mounting hole of a vehicle roof.

Background Information

There is known, as a conventional antenna mounted to a vehicle roof, a roof-mount antenna as disclosed in, for example, Japanese Patent Application Publication No. 2001-036315 (Patent Document 1). This vehicle roof-mount antenna is fixed to the vehicle roof in such a way that a screw boss protruding from an antenna base is inserted into a mounting hole formed in the vehicle roof, and a nut is fastened to the screw boss from a vehicle interior side. In such a configuration, a worker may be in danger of dropping the nut during mounting work, or workability may be deteriorated since the worker makes the fastening from the vehicle interior side through the vehicle roof.

To solve such deterioration of workability, Japanese Patent Application Kokai Publication No. 2006-248486 (Patent Document 2) filed by the same applicant as the present application discloses a roof-mount antenna mounting structure capable of facilitating mounting of the antenna to the vehicle and thus of reducing a burden on a worker. The mounting structure uses a legged washer and is inserted into a mounting hole formed in a vehicle roof from outside a vehicle interior. Since the leg parts of the legged washer are closed when being inserted, the mounting structure can be made to pass through the mounting hole. Then, in association with fastening of a bolt and the like from the vehicle interior side, leg parts of the legged washer abut against an abutment part formed in a screw boss to open, with the result that pawls of the respective leg parts bite into a vehicle interior side of the vehicle roof, whereby fixing to the vehicle roof and electrical connection to (grounded to) the vehicle roof can be achieved.

Further, there is also known a vehicle antenna in which a legged washer that has been fixed to a boss with a bolt is pressed against the vehicle roof (Specification of Chinese Patent Application Publication No. 106,129,583—Patent Document 3). Specifically, guide plates, each of which is configured by horizontally bending and rolling inward the side surface of each of leg parts of a legged washer, hold projections provided in the boss so as to guide the legged washer along the projections.

SUMMARY

In the roof-mount antenna mounting structure described in Patent Document 2, the legged washer is constituted by a thick plate body so that claws can reliably bite into the vehicle roof. Therefore, to make the leg parts of the legged washer abut against an abutment part of the screw boss so as to open them, a very large force is required upon bolt fastening, imposing a large burden on a worker. Further, there is a risk of deformation of the vehicle roof due to the large force upon bolt fastening. Further, using the thick plate body involves an increase in the weight of the roof-mount antenna mounting structure to some extent.

Further, in the vehicle antenna described in Patent Document 3, the guide plates have a complicated bending structure and need to be correctly bent so as to be guided along the projections, which may involve an increase in cost. In addition, the guide plates are each formed by horizontally bending and rolling the side surface of the leg part, so that if a force is applied in such a direction as to open the leg parts upon bolt fastening, the guide plates bended and rolled may open. Furthermore, upon mounting to the vehicle roof by pressing, the position of the legged washer is not fixed with respect to the boss, so that there may be no space between the base and claws, failing to interpose the vehicle roof therebetween.

The present invention has been made in view of the above situation, and an object thereof is to provide a roof-mount antenna mounting structure capable of being manufactured in a lightweight and inexpensive manner, being mounted with less force upon fastening, and being reliably temporarily fixed to the vehicle roof.

To achieve the above object of the present invention, a roof-mount antenna mounting structure according to the present invention includes: a first threaded part provided on an antenna base to be disposed outside a vehicle interior, protruding toward a vehicle roof side and inserted into the mounting hole of the vehicle roof; a second threaded part fastened to the first threaded part; a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base and having such elasticity that it closes once when the legged washer is inserted into the mounting hole of the vehicle roof from the washer ring side and recovers to substantially the original opening state after insertion; a leg opening preventing part configured to prevent the leg part from opening at a predetermined angle or more when the claws abut against the vehicle roof after fastening between the first threaded part and the second threaded part through the washer ring of the legged washer and having a horizontal part obtained by being cut from the leg part at a portion in the vicinity between the plurality of claws and being horizontally bent and a vertical part bent so as to extend vertically from the horizontal part; and a receiving part provided in at least one of the first threaded part and the second threaded part and configured to receive the vertical part of the leg opening preventing part so as to limit the movement of the leg part in the opening direction thereof when the claws of the legged washer abut against the vehicle roof.

Further, the roof-mount antenna mounting structure according to the present invention may be configured to include: a first threaded part provided on an antenna base to be disposed outside a vehicle interior, protruding toward a vehicle roof side and inserted into the mounting hole of the vehicle roof; a second threaded part fastened to the first threaded part; a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base, having a side bent part extending from the side of the leg part in the perpendicular direction, and having such elasticity that it closes once when the legged washer is inserted into the mounting hole of the vehicle roof from the washer ring side and recovers to substantially the original opening state after insertion; a leg opening preventing part configured to prevent the leg part from opening at a predetermined angle or more when the claws abut against the vehicle roof after fastening between the first threaded part and the second threaded part through the washer ring of the legged washer and provided at the tip of the side bent part of the leg part; and a receiving part provided in at least one of the first threaded part and the second threaded part and configured to receive a side end of the leg opening preventing part so as to limit the movement of the leg part in the opening direction thereof when the claws of the legged washer abut against the vehicle roof.

Further, the roof-mount antenna mounting structure according to the present invention may be configured to include: a first threaded part provided on an antenna base to be disposed outside a vehicle interior, protruding toward a vehicle roof side and inserted into the mounting hole of the vehicle roof; a second threaded part fastened to the first threaded part; a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base, having a side bent part extending from the side of the leg part in the perpendicular direction, and having such elasticity that it closes once when the legged washer is inserted into the mounting hole of the vehicle roof from the washer ring side and recovers to substantially the original opening state after insertion; a leg opening preventing part configured to prevent the leg part from opening at a predetermined angle or more when the claws abut against the vehicle roof after fastening between the first threaded part and the second threaded part through the washer ring of the legged washer and formed by slitting the side bent part and bending the slitted part; and a receiving part provided in at least one of the first threaded part and the second threaded part and configured to receive a side end of the leg opening preventing part so as to limit the movement of the leg part in the opening direction thereof when the claws of the legged washer abut against the vehicle roof.

The legged washer may have a temporary fixing part for temporarily fixing the legged washer in such a degree that tips of the claws float from the vehicle roof after insertion of the legged washer into the mounting hole of the vehicle roof from the washer ring side and before fastening between the first threaded part and the second threaded part, and at least one of the antenna base, the receiving part, the first threaded part, and the second threaded part may have a locking part to which the temporary fixing part is locked.

Further, the roof-mount antenna mounting structure according to the present invention may be configured to include: a first threaded part provided on an antenna base to be disposed outside a vehicle interior, protruding toward a vehicle roof side and inserted into the mounting hole of the vehicle roof; a second threaded part fastened to the first threaded part; a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base and having such elasticity that it closes once when the legged washer is inserted into the mounting hole of the vehicle roof from the washer ring side and recovers to substantially the original opening state after insertion; a leg opening preventing part configured to prevent the leg part from opening at a predetermined angle or more when the claws abut against the vehicle roof after fastening between the first threaded part and the second threaded part through the washer ring of the legged washer; a receiving part provided in at least one of the first threaded part and the second threaded part and configured to receive the leg opening preventing part so as to limit the movement of the leg part in the opening direction thereof when the claws of the legged washer abut against the vehicle roof; a temporary fixing part for temporarily fixing the legged washer in such a degree that tips of the claws float from the vehicle roof after insertion of the legged washer into the mounting hole of the vehicle roof from the washer ring side and before fastening between the first threaded part and the second threaded part; and a locking part provided in at least one of the antenna base, the receiving part, the first threaded part, and the second threaded part, to which the temporary fixing part is locked.

The temporary fixing part may be provided in the leg opening preventing part.

The leg opening preventing part may be configured such that, when the first threaded part and the second threaded part are fastened through the washer ring, the temporary fixing part is displaced in the fastening direction to come off from the locking part, which allows the leg opening preventing part to be pressed in a direction preventing the leg part from opening at a predetermined angle or more.

The washer ring of the legged washer may have a bent part so as to prevent co-rotation of the legged washer when the first threaded part and the second threaded part are fastened through the washer ring and/or to reinforce the washer ring.

The roof-mount antenna mounting structure may include a fall preventing locking part to be locked to the mounting hole of the vehicle roof so as to prevent the legged washer from falling from the vehicle roof when an antenna is removed from the mounting hole of the vehicle roof.

The fall preventing locking part may be released from its locked state to the mounting hole of the vehicle roof when the leg opening preventing part is pressed in a direction closing the leg part of the legged washer.

Further, the roof-mount antenna mounting structure according to the present invention may be configured to include: a first threaded part provided on an antenna base to be disposed outside a vehicle interior, protruding toward a vehicle roof side and inserted into the mounting hole of the vehicle roof; a second threaded part fastened to the first threaded part; a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base and having such elasticity that it closes once when the legged washer is inserted into the mounting hole of the vehicle roof from the washer ring side and recovers to substantially the original opening state after insertion; a temporary fixing part for temporarily fixing the legged washer in such a degree that tips of the claws float from the vehicle roof after insertion of the legged washer into the mounting hole of the vehicle roof from the washer ring side and before fastening between the first threaded part and the second threaded part; and a locking part provided in at least one of the antenna base, first threaded part, and second threaded part, to which the temporary fixing part is locked.

The washer ring of the legged washer may have a bent part so as to prevent co-rotation of the legged washer when the first threaded part and the second threaded part are fastened through the washer ring and/or to reinforce the washer ring, and the temporary fixing part may be provided in the bent part.

The through hole of the washer ring of the legged washer may have an internal tooth part serving as a locking structure for the first threaded part or the second threaded part.

The through hole of the washer ring of the legged washer may have a potbelly shape formed by a combination of holes, one of which with an inner diameter larger than and the other of which with an inner diameter substantially the same as the diameter of the first threaded part or the second threaded part.

The leg part of the legged washer may have a reinforcing bent part so as to reinforce the leg part.

The roof-mount antenna mounting structure according to the present invention is capable of being manufactured in a lightweight and inexpensive manner, being mounted with less force upon fastening, and being reliably temporarily fixed to the vehicle roof.

BRIEF DESCRIPTION OF THE DRAWINGS

Referring now to the attached drawings which form a part of this original disclosure.

DETAILED DESCRIPTION OF EMBODIMENTS

Figure 1:
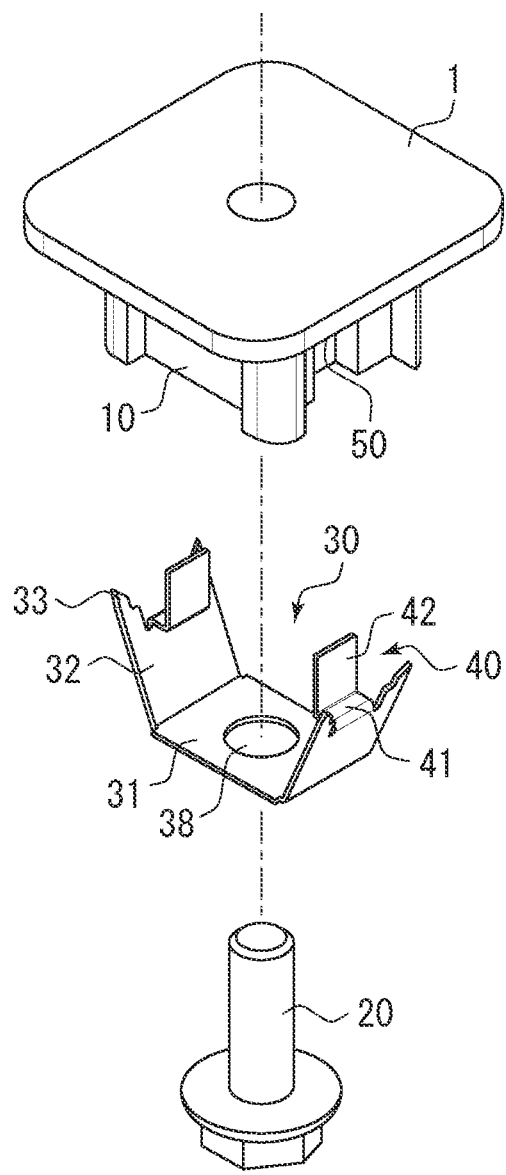
FIG. 1 is a schematic exploded perspective view for explaining a roof-mount antenna mounting structure according to one illustrated embodiment.
Figure 2A:
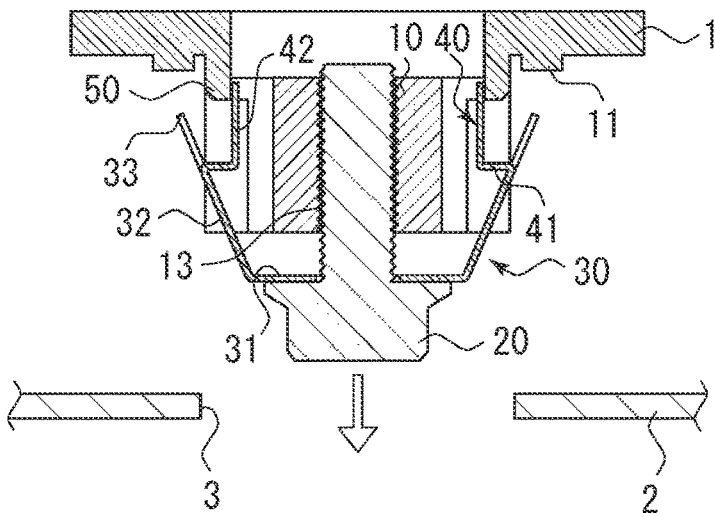
FIG. 2 is partial cross-sectional side views for explaining the roof-mount antenna mounting structure according to the illustrated embodiment.
Figure 2B:
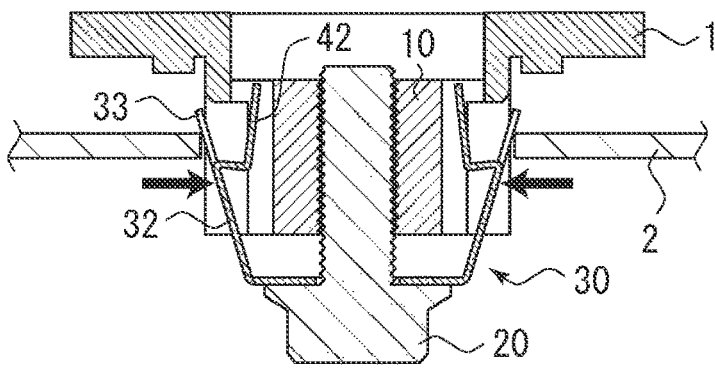
Figure 2C:
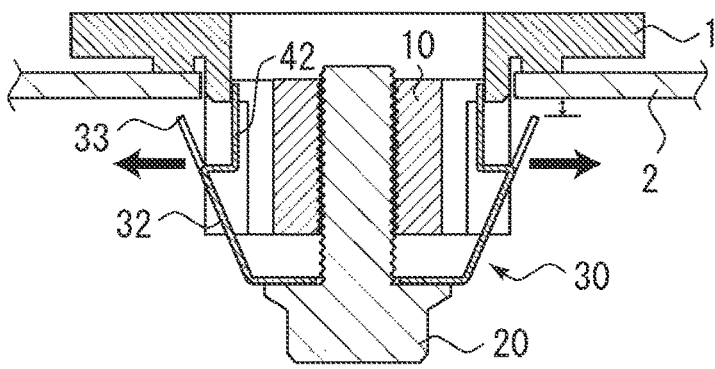
Figure 2D:
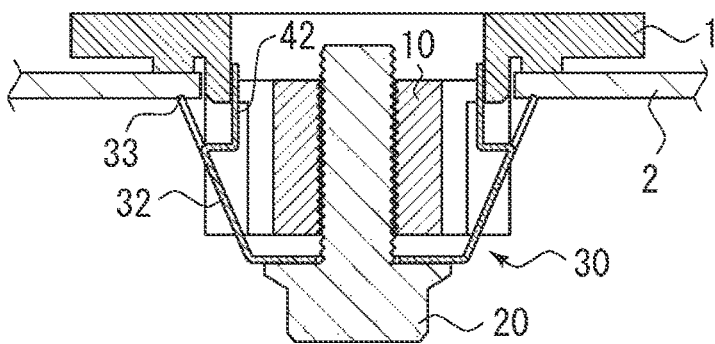

Hereinafter, an embodiment for practicing the present invention will be described with reference to the accompanying drawings. A roof-mount antenna mounting structure according to the present invention is used for fixing an antenna to a mounting hole formed in a vehicle roof. FIG. 1 is a schematic exploded perspective view for explaining the roof-mount antenna mounting structure according to the present invention. FIG. 2 is partial cross-sectional side views for explaining the roof-mount antenna mounting structure according to the present invention. FIG. 2A illustrates a state before the roof-mount antenna mounting structure is inserted, FIG. 2B illustrates a state where the roof-mount antenna mounting structure is being inserted, FIG. 2C illustrates a temporarily fixing state after insertion of the roof-mount antenna mounting structure and before fastening thereof, and FIG. 2D illustrates a state after fastening of the roof-mount antenna mounting structure. In the drawings, the same reference numerals as those in FIG. 1 denote the same parts. As illustrated, the roof-mount antenna mounting structure according to the present invention mainly includes a first threaded part 10, a second threaded part 20, a legged washer 30, a leg opening preventing part 40, and a receiving part 50.

The first threaded part 10 is provided on an antenna base, protruding toward a vehicle roof 2 side and inserted in to the mounting hole 3 of the vehicle roof 2. In the illustrated example, the first threaded part 10 is like a so-called screw boss having a female threaded hole 13. The first threaded part 10 has a hole (not illustrated) through which a cable or the like can be inserted, and the antenna is connected to a receiver or the like in a vehicle interior by a cable through the hole.

The antenna base 1 is disposed outside a vehicle interior. More specifically, the antenna base 1 is disposed on the vehicle roof 2 outside the vehicle interior and has a circuit board, an antenna element, and the like placed thereon. The antenna base 1 may function as the ground for the circuit board or an antenna to be mounted thereto and may be formed of a conductor. Alternatively, the antenna base 1 may be made of resin. A claw receiving base 11 may be provided on the vehicle roof 2 side surface of the antenna base 1 as needed.

The second threaded part 20 is fastened to the first threaded part 10. In the illustrated example, the second threaded part 20 is a male thread (bolt). That is, the second threaded part 20 is screwed into the female threaded hole 13 of the first threaded part 10.

Although the first threaded part 10 is constituted by a female threaded hole and the second threaded part 20 are constituted by a bolt in the illustrated example, the present invention is not limited to this. For example, the first threaded part 10 may be constituted by a male thread and the second threaded part 20 may be constituted by a nut. That is, the first threaded part 10 and second threaded part 20 may be able to fasten the legged washer 30 therebetween.

The legged washer 30 has a washer ring 31 and a leg part 32. The legged washer 30 may be formed of a conductive plate body. The legged washer 30 may be integrally molded by pressing, e.g., a metal plate. The washer ring 31 has a through hole 38 through which the first threaded part 10 or second threaded part 20 penetrates. In the illustrated example, the bolt as the second threaded part 20 penetrates through the through hole 38. Further, the washer ring 31 may have a size smaller than the diameter of the mounting hole 3 of the vehicle roof 2. That is, the washer ring 31 may have a size small enough to pass through the mounting hole 3. In the illustrated example, the washer ring 31 has a substantially quadrangular shape; however, the present invention is not limited to this, and the washer ring 31 may have any shape such as a circular shape, a hexagonal shape, or an octagonal shape.

The leg part 32 extends from the washer ring 31. In the illustrated example, the leg part 32 extends from both side ends of the washer ring 31. Specifically, the leg part 32 extends from the two side ends of the washer ring 31, and the remaining two sides that have no leg part 32 may be made to correspond to a cable insertion hole (not illustrated) or the like formed in the first threaded part 10. The leg part 32 has a plurality of claws 33 that can abut against the vehicle roof 2. The claws 33 bite into the vehicle roof 2 upon fastening of the bolt as the second threaded part 20. The claw receiving base 11 is positioned so as to correspond to the biting position of the claws 33 through the vehicle roof 2 such that the vehicle roof 2 is sandwiched between the claw receiving base 11 and the claws 33. In the illustrated example, although the plurality of claws 33 are provided at the tip of the leg part 32, the present invention is not limited to this, and the claws 33 may be referred to as the leg part 32. Further, although the leg part 32 includes left and right legs extending from the washer ring 31, it may include three legs, for example.

As illustrated in FIG. 2A, the leg part 32 has a flare shape opening with a size larger than the diameter of the mounting hole 3 of the vehicle roof 2 from the washer ring 31 toward the antenna base 1. In the roof-mount antenna mounting structure according to the present invention, the leg part 32 of the legged washer 30 has such elasticity that it closes once when the legged washer 30 is inserted into the mounting hole 3 of the vehicle roof 2 from the washer ring 31 side and recovers to substantially the original opening state after insertion. More specifically, upon mounting of a roof-mount antenna to the vehicle roof 2, the legged washer 30 is inserted into the mounting hole 3 of the vehicle roof 2 from the washer ring 31 side. Since the leg part 32 has a flare shape opening with a size larger than the diameter of the mounting hole 3, the leg part 32 first abuts against the edge portion around the mounting hole 3. Then, as illustrated in FIG. 2B, when the roof-mount antenna is further pushed, the leg part 32 once closes due to its elasticity. This allows the leg part 32 to pass through the mounting hole 3. Then, as illustrated in FIG. 2C, when the leg part 32 is completely inserted through the mounting hole 3, it recovers to the original opening state. That is, the leg part 32 may have a spring-like property which allows temporary closing upon insertion and recovery to the original opening state after insertion. As a result, the roof mount antenna is temporarily fixed to the vehicle roof 2.

As described above, in the roof-mount antenna mounting structure according to the present invention, the leg part 32 of the legged washer 30 has such elasticity that it closes once when the legged washer 30 is inserted into the mounting hole 3 of the vehicle roof 2 from the washer ring 31 side and recovers to substantially the original opening state after insertion. That is, the leg part 32 having the claws 33 is made of a material which is soft and thin to some extent. Therefore, when the claws 33 abut against the vehicle roof 2 after fastening between the first threaded part 10 and the second threaded part 20, there is a possibility that the leg part 32 opens at a predetermined angle or more to be deformed. In this case, the claws 33 may fail to bite into the vehicle roof 2 sufficiently. In order to prevent this, in the roof-mount antenna mounting structure according to the present invention, the leg opening preventing part 40 is provided. The leg opening preventing part 40 prevents the leg part 32 from opening at a predetermined angle or more when the claws 33 abut against the vehicle roof 2 after fastening between the first threaded part 10 and the second threaded part 20 through the washer ring 31 of the legged washer 30.

As illustrated in, for example, FIG. 1, the leg opening preventing part 40 may be formed by cutting from the leg part 32. The leg opening preventing part 40 includes a horizontal part 41 and a vertical part 42. The horizontal part 41 is obtained by horizontally bending the leg part 32. The vertical part 42 extends vertically from the horizontal part 41. More specifically, the leg opening preventing part 40 is cut from the leg part 32 at a portion in the vicinity between the plurality of claws 33, bent in the horizontal direction so as to constitute the horizontal part 41 and then further bent in the vertical direction so as to constitute the vertical part 42. As described above, the leg opening preventing part 40 has a shape obtained by once bending inward the leg part 32 at a portion in the vicinity between the plurality of claws 33 and bending once again extending toward the antenna base 1 side. As a result, the leg opening preventing part 40 has the vertical part 42 extending in the insertion direction to the mounting hole 3. Thus, it is possible to allow the two claws positioned at both sides of the leg opening preventing part 40 to uniformly bite into the vehicle roof 2 while preventing the leg part 32 from opening excessively by the leg opening preventing part 40.

Further, as illustrated in FIG. 2D, there is provided the receiving part 50 that receives the vertical part 42 of the leg opening preventing part 40 so as to limit the movement of the leg part 32 in the opening direction thereof when the claws 33 of the legged washer 30 abut against the vehicle roof 2. In the illustrated example, the receiving part 50 is provided in the antenna base 1. The receiving part 50 is disposed at such a position as to make the side surface of the vertical part 42 of the leg opening preventing part 40 abut thereagainst before the claws 33 abut against the vehicle roof 2, and the receiving part 50 is disposed at such a position as to limit the movement of the leg part 32 in the opening direction thereof. On the other hand, the receiving part 50 is configured so as not to limit the movement of the leg part 32 in the opening direction thereof upon insertion into the mounting hole 3. The receiving part 50 need not necessarily be provided in the antenna base 1 as long as it can receive the leg opening preventing part 40 at a position where the movement of the leg part 32 in the opening direction thereof can be restricted. For example, the receiving part 50 may be provided in the first threaded part 10 or second threaded part 20.

With the above configuration, the leg opening preventing part 40 prevents the leg part 32 from opening at a predetermined angle or more when the claws 33 abut against the vehicle roof 2 after fastening between the first threaded part 10 and the second threaded part 20. Thus, even when the legged washer 30 is made of a material which is soft and thin to some extent, the claws 33 can be made to bite into the vehicle roof 2 reliably. Further, a large force is not required for bolt fastening, and there is no risk of deformation of the vehicle roof. Furthermore, since the legged washer 30 can be formed of a thin plate body, light weight and low cost can be achieved.

In the roof-mount antenna mounting structure according to the present invention, the legged washer 30 can be integrally molded by pressing a metal plate which is soft and thin to Kale extent, so that the legged washer 30 cannot withstand a fastening force upon fastening between the first threaded part 10 and the second threaded part 20 under some conditions. To cope with such a situation, the legged washer 30 may be reinforced. The following describes a specific example of a reinforcing structure for the legged washer 30 referring to FIG. 3.

Figure 3:
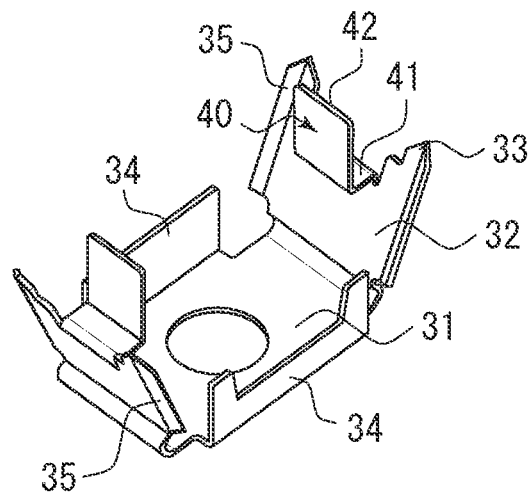
FIG. 3 is a schematic perspective view for explaining the details of a legged washer of the roof-mount antenna mounting structure according to the illustrated embodiment.

FIG. 3 is a schematic perspective view for explaining details of the legged washer of the roof-mount antenna mounting structure according to the present invention. In the drawings, the same reference numerals as those in FIG. 1 denote the same parts. As illustrated, the washer ring 31 of the legged washer 30 has, for example, a bent part 34. The bent part 34 extends from the washer ring 31 and may be formed by bending the side of the washer ring 31 in, for example, the same direction as the extending direction of the leg part 32, i.e., toward the antenna base 1 side. By thus forming the bent part 34, the washer ring 31 is reinforced.

Further, the bent part 34 may have a function of preventing co-rotation of the legged washer 30 when the first threaded part 10 and the second threaded part 20 are fastened through the washer ring 31. Specifically, the bent part 34 is bent so as to abut against the first threaded part 10 and sandwiches the opposing two sides of the first threaded part 10. With this configuration, when the first threaded part 10 and the second threaded part 20 are fastened, the bent part 34 abuts against the first threaded part 10 to thereby prevent co-rotation of the legged washer 30.

Further, as illustrated in FIG. 3, the leg part 32 of the legged washer 30 may have a reinforcing bent part 35 so as to reinforce the leg part 32. The reinforcing, bent part 35 extends from the leg part 32 and may be formed by bending the side of the leg part 32 toward, for example, the first threaded part 10 side or second threaded part 20 side. By thus forming the reinforcing bent part 35, the leg part 32 is reinforced.

FIG. 2C is referred to again. FIG. 2C illustrates a state where the roof-mount antenna is temporarily fixed to the vehicle roof 2, i.e., a state after insertion of the legged washer 30 into the mounting hole 3 of the vehicle roof 2 from the washer ring 31 side and before fastening between the first threaded part 10 and the second threaded part 20. Since the first threaded part 10 and the second threaded part 20 have not been fastened to each other in this state, the tips of the claws 33 are not brought into contact with the vehicle roof. When the tips of the claws 33 are in contact with the antenna base 1 in the middle of insertion of the legged washer 30, the leg part 32 may fail to recover to the original opening state after penetration through the mounting hole 3. That is, the vehicle roof 2 needs to be positioned in a gap between the antenna base 1 and the claws 33. Therefore, in a temporarily fixed state, preferably the legged washer 30 is temporarily fixed in such a degree that tips of the claws 33 float from the vehicle roof 2. To this end, in the roof-mount antenna mounting structure according to the present invention, the legged washer 30 may have a temporary fixing part. The temporary fixing part is provided for temporarily fixing the legged washer 30 in such a degree that tips of the claws 33 float from the vehicle roof 2 after insertion of the legged washer 30 into the mounting hole 3 of the vehicle roof 2 from the washer ring 31 side and before fastening between the first threaded part 10 and the second threaded part 20. The following describes a specific example of the temporary fixing part using FIGS. 4A and 4B.

Figure 4A:
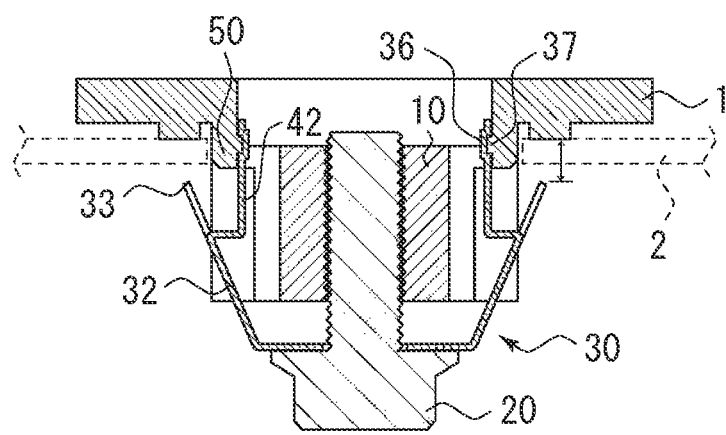
FIG. 4 is partial cross-sectional side views for explaining the details of a temporary fixing structure of the roof-mount antenna mounting structure according to the illustrated embodiment.
Figure 4B:
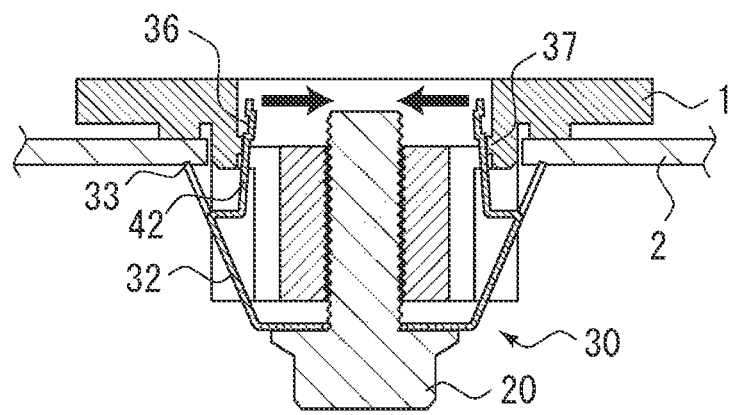

FIG. 4 is partial cross-sectional side views for explaining the details of a temporary fixing structure of the roof-mount antenna mounting structure according to the present invention. FIG. 4A illustrates a state before insertion, and FIG. 4B illustrates a state after insertion. In the drawings, the same reference numerals as those in FIG. 1 denote the same parts. As illustrated, a temporary fixing part 36 may be provided in the leg opening preventing part 40. Specifically, for example, the temporary fixing part 36 may be realized by a hole, or recess or projection formed in the vertical part 42 of the leg opening preventing part 40. In the illustrated example, the temporary fixing part 36 is formed into a recess. A locking part 37 corresponding to the temporary fixing part 36 may be formed in, for example, the antenna base receiving part 50, first threaded part 10, or second threaded part 20, i.e., in a member other than the legged washer 30. The locking part 37 may be realized by, for example, a projection having a shape corresponding to the temporary fixing part 36 and configured to be locked to the temporary fixing part 36 formed into a recess.

In the thus configured roof-mount antenna mounting structure according to the present invention, the second threaded part 20 is screwed into the first threaded part 10 through the legged washer 30 for temporary fixing. At this time, as illustrated in FIG. 4A, the legged washer 30 having the temporary fixing part 36 is locked to the locking part 37 to be temporarily fixed in position. The temporarily fixed position may be determined so as to achieve a state where the tips of the claws 33 separate from the vehicle roof 2. The temporary fixing part 36 and locking part 37 may be locked to each other with such a force that they do not come off from each other with a pressing force upon insertion into the mounting hole 3 of the vehicle roof 2 but come off from each other with a pressing force upon fastening between the first threaded part 10 and the second threaded part 20.

As illustrated in FIG. 4B, the temporary fixing part 36 is displaced in the fastening direction upon fastening between the first threaded part 10 and the second threaded part 20 to come off from the locking part 37. At this time, the leg opening preventing part 40 is pressed inward by the projecting locking part 37. That is, the leg opening preventing part 40 is pressed in a direction preventing the leg part 32 from opening at a predetermined angle or more. Similarly, even when the temporary fixing part 36 and the locking part 37 are realized by a projection and a recess, respectively, the leg opening preventing part 40 is pressed in a direction preventing the leg part 32 from opening at a predetermined angle or more.

With this configuration, the roof-mount antenna mounting structure according to the present invention can facilitate mounting work to the vehicle roof 2. Further, the leg part 32 is configured so as not to open at a predetermined angle or more, so that even when the fastening is made with a larger force, the claws 33 can be made to bite into the vehicle roof 2 reliably.

The configuration for temporarily fixing the legged washer 30 is not limited to the above-described examples. For example, a structure may be allowed such that the washer ring 31 of the legged washer 30 is fixed at a predetermined position of the second threaded part 20 as a bolt. The following describes a specific example of the washer ring 31 using FIGS. 5A and 5B.

Figure 5A:
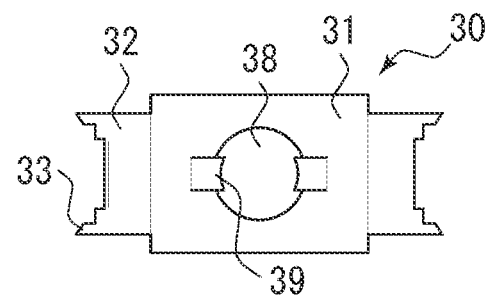
FIG. 5 is schematic views for explaining the details of a washer ring of the legged washer of the roof-mount antenna mounting structure according to the illustrated embodiment.
Figure 5B:
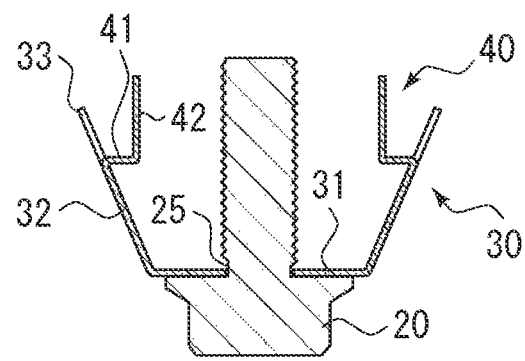

FIG. 5 is schematic views for explaining the details of the washer ring of the legged washed of the roof-mount antenna mounting structure according to the present invention. FIG. 5A is a top view of the washer ring, and FIG. 5B is a cross-sectional side view of the washer ring. In the drawings, the same reference numerals as those in FIG. 1 denote the same parts. As illustrated, the through hole 38 of the washer ring 31 has an internal tooth part 39. The internal tooth part 39 serves as a locking structure for the second threaded part 20. More specifically, as illustrated in FIG. 5B, when the second threaded part 20 is a bolt, an idling part 25 having no thread is formed at the root (boundary between the threaded portion of the bolt and the head thereof) of the bolt. A gap between the internal tooth parts 39 may be set so as to allow the thread of the second threaded part 20 to abut against the internal tooth parts 39 and to be screwed therebetween and so as not to allow the internal tooth parts 39 to contact the idling part 25.

Upon temporary fixing, the second threaded part 20 is inserted through the washer ring 31 of the legged washer 30 so as to reach the idling part 25. Then, the second threaded part 20 is screwed into the first threaded part 10 through the legged washer 30. At this time, the second threaded part 20 is not screwed completely but to such a degree that tips of the claws 33 float from the vehicle roof 2. Thus, it is possible to temporarily fix the legged washer 30 to thereby facilitate mounting work to the vehicle roof 2.

Figure 6:
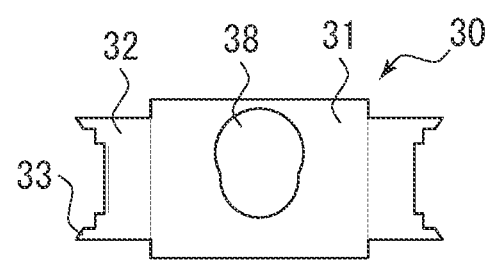
FIG. 6 is a schematic top view for explaining the details of another example of the washer ring of the legged washer of the roof-mount antenna mounting structure according to the illustrated embodiment.

Another example of the washer ring will be described using FIG. 6. FIG. 6 is a schematic top view for explaining the details of another example of the washer ring of the legged washer of the roof-mount antenna mounting structure according to the present invention. In the drawings, the same reference numerals as those in FIG. 1 denote the same parts. As illustrated, the through hole 38 of the washer ring 31 may have a potbelly shape. The potbelly shape is a combination of a hole with an inner diameter larger than the diameter of the second threaded part 20 and a hole with an inner diameter substantially the same as the diameter of the second threaded part 20.

Upon temporary fixing, the second threaded part 20 is inserted through the larger diameter one of the holes of the potbelly shape of the washer ring 31. Then, the washer ring 31 is moved to the root of the bolt and slid laterally to be fitted to the hole with an inner diameter substantially the same as the diameter of the second threaded part 20. Thus, it is possible to temporarily fix the legged washer 30 to thereby facilitate mounting work to the vehicle roof 2.

Figure 7:
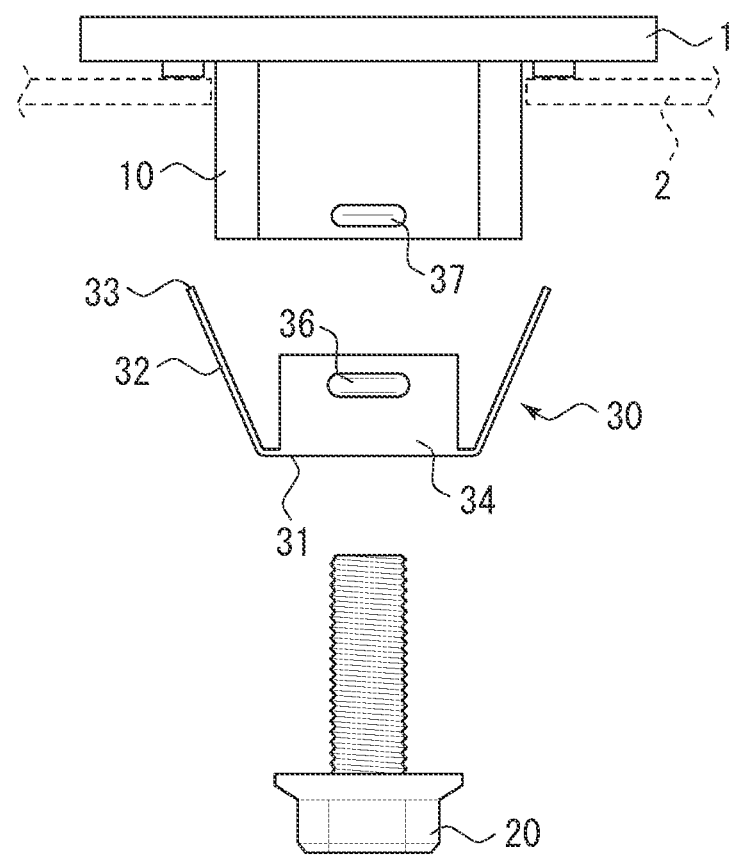
FIG. 7 is a schematic exploded side view for explaining another example of the temporary fixing structure of the roof-mount antenna mounting structure according to the illustrated embodiment.
Figure 8A:
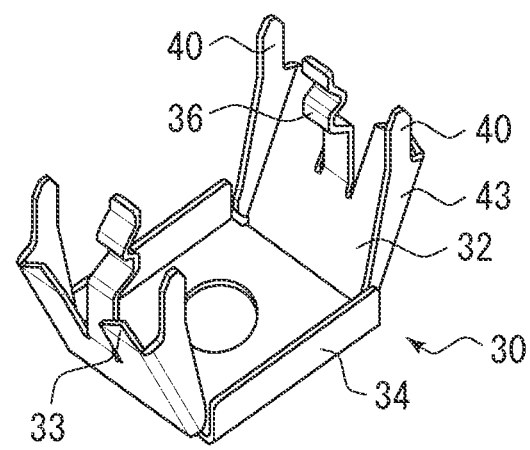
FIG. 8 is schematic views for explaining another example of a leg opening preventing part of the roof-mount antenna mounting structure according to the illustrated embodiment.
Figure 8B:
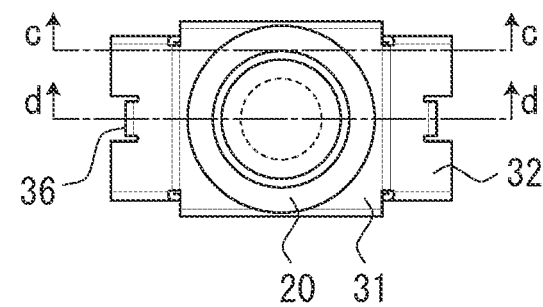
Figure 8C:
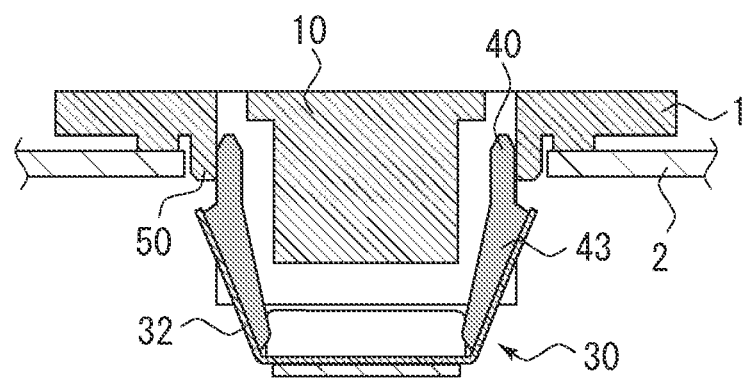
Figure 8D:
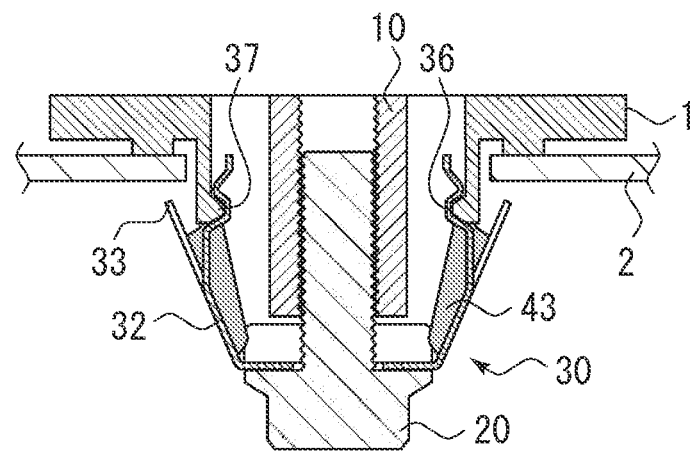

The following describes another example of the temporary fixing structure of the roof-mount antenna mounting structure according to the present invention. FIG. 7 is a schematic exploded side view for explaining another example of the temporary fixing structure of the roof-mount antenna mounting structure according to the present invention. In the drawings, the same reference numerals as those in FIG. 1 denote the same parts. In the illustrated example, the temporary fixing part 36 is realized by a recess formed in the bent part 34 of the legged washer 30. Alternatively, the temporary fixing part 36 may be realized by a hole or a projection. The locking part 37 to which the temporary fixing part 36 is locked may be formed in the first threaded part 10, for example. In the illustrated example, the locking part 37 is realized by a projection having a shape corresponding to the temporary fixing part 36 as a recess and formed in the first threaded part 10. Although the locking part 37 is formed in the first threaded part 10 in the illustrated example, the present invention is not limited to this, and the locking part 37 may be formed in the antenna base 1 or second threaded part 20.

In the thus configured roof-mount antenna mounting structure according to the present invention, the second threaded part 20 is screwed into the first threaded part 10 through the legged washer 30 for temporary fixing. At this time, the legged washer 30 having the temporary fixing part 36 is locked to the locking part 37 to be temporarily fixed in position. The temporarily fixed position may be determined so as to achieve a state where the tips of the claws 33 separate from the vehicle roof 2. The temporary fixing part 36 and locking part 37 may be locked to each other with such a force that they do not come off from each other with a pressing force upon insertion into the mounting hole 3 of the vehicle roof 2 but come off from each other with a pressing force upon fastening between the first threaded part 10 and the second threaded part 20.

FIG. 8 is schematic views for explaining another example of the leg opening preventing part of the roof-mount antenna mounting structure according to the present invention. FIG. 8A is a perspective view, FIG. 8B is a top view, FIG. 8C is a cross-sectional view taken along the line c-c, and FIG. 8D is a cross-sectional view taken along the line d-d. In the drawings, the same reference numerals as those in FIG. 1 denote the same parts. As illustrated, in this example, the legged washer 30 has a side bent part 43 extending from the side of the leg part 32 in the perpendicular direction. That is, the side bent part 43 is formed by perpendicularly bending the side of the leg part 32. The leg opening preventing part 40 is provided at the tip of the side bent part 43. The tip of the side bent part 43 refers to the tip direction of the leg part 32. The leg opening preventing part 40 extending from the tip of the side bent part 43 is received by the receiving part 50 so as to limit the movement of the leg part 32 in the opening direction. At this time, the receiving part 50 is configured to receive the side end of the leg opening preventing part 40. That is, the leg opening preventing part 40 is perpendicularly brought into line contact with the receiving part 50. The direction of the line contact is parallel to the fastening direction.

With this configuration, the leg opening preventing part 40 provided in the tip of the plate shaped side bent part 43 is perpendicularly brought into line contact with the receiving part 50, so that it is possible to more reliably prevent the leg part 32 from opening in its opening direction. Further, friction between the leg opening preventing part 40 and the receiving part 50 is low due to the line contact and thus does not impede fastening, thereby facilitating fastening work. In addition, the leg opening preventing part 40 is not configured to hold the receiving part 50, dimension control need not be performed so strictly, thus facilitating manufacturing.

In the illustrated example, the temporary fixing part 36 is formed by cutting from the leg part 32 at a portion in the vicinity between the plurality of claws 33. As illustrated, the temporary fixing part 36 is formed into a spring shape and locked to the projecting locking part 37. Such a temporary fixing part 36 may be provided on the bent part 34 side as a spring shape.

Figure 9A:
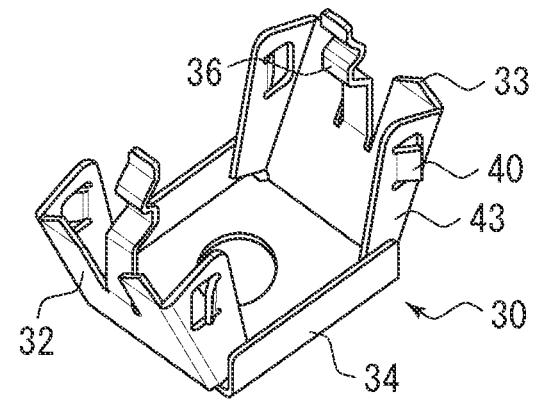
FIG. 9 is schematic views for explaining still another example of the leg opening preventing part of the roof-mount antenna mounting structure according to the illustrated embodiment.
Figure 9B:
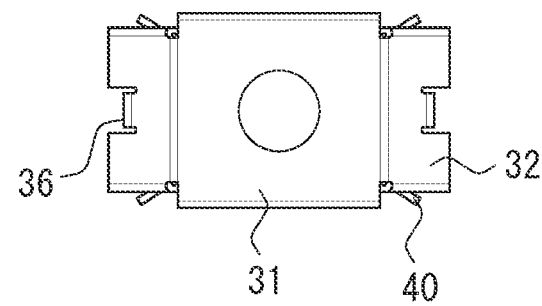
Figure 9C:
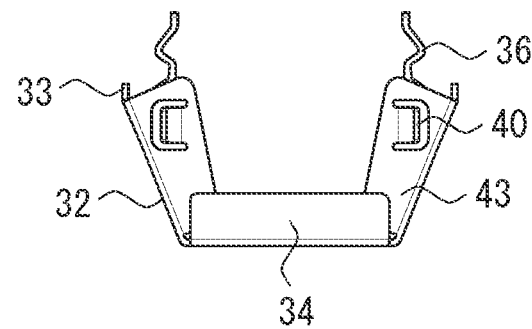

FIG. 9 is schematic views for explaining still another example of the leg opening preventing part of the roof-mount antenna mounting structure according to the present invention. FIG. 9A is a perspective view, FIG. 9B is a top view, and FIG. 9C is a side view. In the drawings, the same reference numerals as those in FIG. 1 denote the same parts. In FIGS. 9A to 9C, only the legged washer 30 is illustrated. As illustrated, in this example, the legged washer 30 has a side bent part 43 extending from the side of the leg part 32 in the perpendicular direction. That is, the side bent part 43 is formed by perpendicularly bending the side of the leg part 32. Then, the leg opening preventing part 40 is formed by slitting the side bent part 43 and bending the slitted part. That is, the leg opening preventing part 40 is formed so as to rise obliquely laterally outward from the side bent part 43. The leg opening preventing part 40 formed by slitting the side bent part 43 and bending the slitted part is received by the receiving part 50 so as to limit the movement of the leg part 32 in the opening direction. At this time, the receiving part 50 is configured to receive the side end of the leg opening preventing part 40. That is, the leg opening preventing part 40 obliquely abuts against the receiving part 50 but is brought into line contact with the receiving part 50. The direction of the line contact is parallel to the fastening direction.

In the illustrated example, the bent part 34 is bent outward of the side bent part 43. Thus, when the claws 33 abut against the vehicle roof 2 in a state where the first threaded part 10 and the second threaded part 20 are fastened, the bent part 34 can serve as a guard plate for preventing the leg part 32 from twisting or laterally curving in a direction different from the closing direction thereof.

Figure 10A:
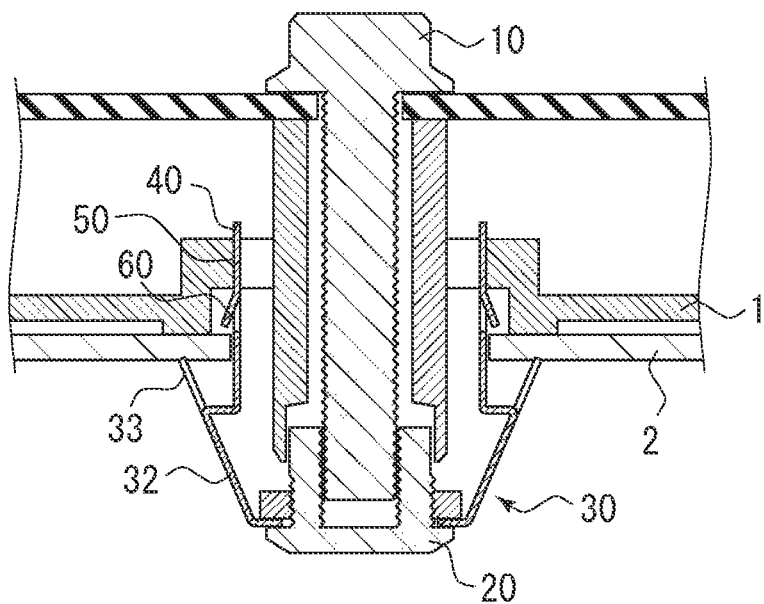
FIG. 10 is partial cross-sectional side views for explaining an example in which a fall preventing locking part is provided in the roof-mount antenna mounting structure according to the illustrated embodiment.
Figure 10B:
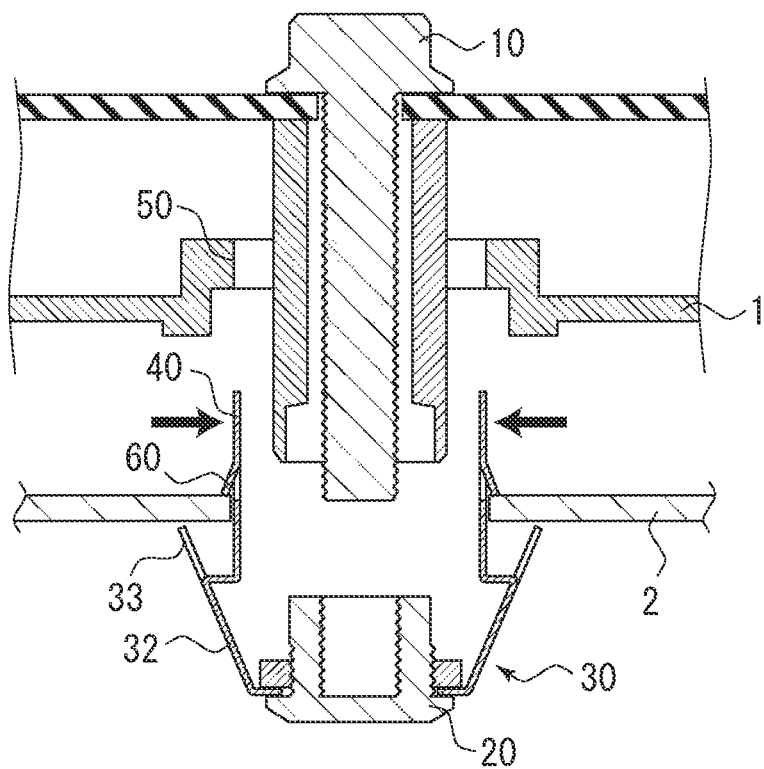

The following describes an example in which a fall preventing locking part is provided so as to prevent the legged washer from falling from the vehicle roof. FIG. 10 is partial cross-sectional side views for explaining an example in which a fall preventing locking part is provided in the roof-mount antenna mounting structure according to the present invention. FIG. 10A illustrates a state after fastening, and FIG. 10B illustrates a state where fastening between threaded parts is released. In the drawings, the same reference numerals as those in FIG. 1 denote the same parts. The first threaded part 10 and the second threaded part 20 are constituted by a female threaded hole and a bolt, respectively, in the above-described illustrated examples, while in FIGS. 10A and 10B, the first threaded part 10 is constituted by a bolt, and the second threaded part 20 is constituted by a nut. However, the present invention is not limited to this, and any configuration may be applied as long as the legged washer 30 can be fastened using the first threaded part 10 and the second threaded part 20.

The illustrated roof-mount antenna is fastened by the first threaded part 10 and fixed to the vehicle roof not from the vehicle interior side but from outside the vehicle interior. Thus, the roof-mount antenna mounting structure having such a configuration can be fastened from outside the vehicle interior and is usable even when there is no space for passing a fastening tool due to vehicle design or cable routing to make it difficult to perform fastening work from the vehicle interior side.

When the antenna is removed from the mounting hole of the vehicle roof for repair, maintenance, or the like, fastening of the first threaded part 10 is released as illustrated in FIG. 10B. At this time, when the legged washer 30 falls from the vehicle roof 2, it needs to be caught by some measures, complicating mounting work. Thus, in the roof-mount antenna mounting structure according to the present invention, a fall preventing locking part 60 is provided in the legged washer 30 so as to prevent the legged washer 30 from falling from the vehicle roof 2. The fall preventing locking part 60 is locked to the mounting hole of the vehicle roof 2 when the antenna is removed from the mounting hole of the vehicle roof 2. The illustrated frill preventing locking part 60 is designed to be applied to the legged washer 30 having a configuration as illustrated in FIGS. 1 and 2A to 2D. Specifically, the tall preventing locking part 60 is formed by slitting the leg opening preventing part 40 and bending the slitted portion outward of the mounting hole. With this configuration, when, for example, only the roof-mount antenna main body is replaced with new one, reuse of the legged washer can be facilitated.

Further, the fall preventing locking part 60 may be configured to be released from its locked state to the mounting hole of the vehicle roof 2 when the leg opening preventing part 40 is pressed in a direction closing the leg part 32 of the legged washer 30. That is, the fall preventing locking part 60 may protrude in a direction opposite to the closing direction of the leg part 32 so as to be locked to the mounting hole. Thus, when the legged washer 30 needs to be replaced with new one, it can be easily removed from the mounting hole of the vehicle roof 2.

Figure 11A:
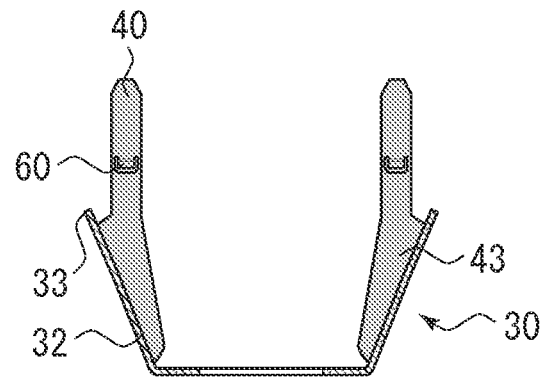
FIG. 11 is partial cross-sectional side views for explaining another example in which the fall preventing locking part is provided in the roof-mount antenna mounting structure according to the illustrated embodiment.
Figure 11B:
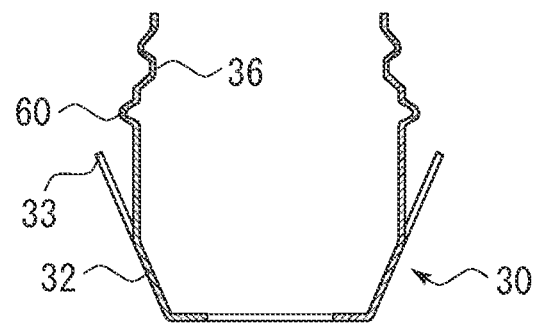
Figure 11C:
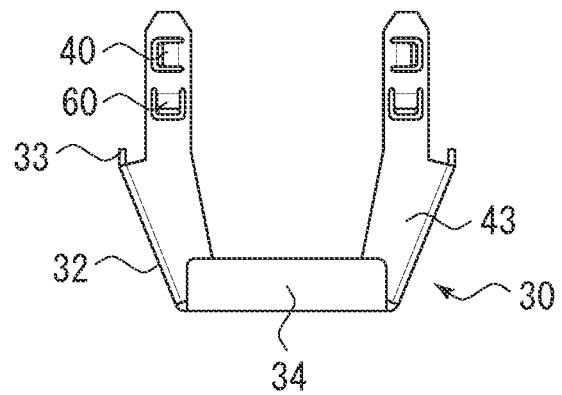

FIG. 11 is partial cross-sectional side views for explaining another example in which the fall preventing locking part is provided in the roof-mount antenna mounting structure according to the present invention. FIG. 11A is an example in which the fall preventing locking part is applied to the legged washer having a configuration as illustrated in FIGS. 8A to 8D. Specifically, the fall preventing locking part 60 is formed in the leg opening preventing part 40 constituted by the side bent part 43. FIG. 11B is an example in which the fall preventing locking part is applied to the legged washer having a configuration as illustrated in FIGS. 8A to 8D. Specifically, the fall preventing locking part 60 is provided in the temporary fixing part 36 of the legged washer 30. FIG. 11C is an example in which the fall preventing locking part is applied to the legged washer having a configuration as illustrated in FIGS. 9A to 9C. Specifically, the fall preventing locking part 60 is formed in the side bent part 43 having the leg opening preventing part 40. In any of the above examples, the fall preventing locking part 60 may be formed at a predetermined position so as to be locked to the mounting hole by slitting the conductive plate body and then bending the slitted part or by bending the conductive plate body into a spring shape.

By thus making the legged washer 30 have a structure including the fall preventing locking part 60, it is possible to prevent the legged washer 30 from falling from the vehicle roof 2 even when fastening between the threaded parts is released upon removal of the antenna from the mounting hole of the vehicle roof 2.

The roof-mount antenna mounting structure according to the present invention is not limited to the above illustrated examples but may be variously modified without departing from the scope of the present invention.

The invention claimed is:

1. A roof-mount antenna mounting structure for fixing an antenna to a mounting hole of a vehicle roof, the roof-mount antenna mounting structure comprising:
a first threaded part provided on an antenna base to be disposed outside a vehicle interior, protruding toward a vehicle roof side and inserted into the mounting hole of the vehicle roof;
a second threaded part fastened to the first threaded part;
a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base and having such elasticity that it closes once when the legged washer is inserted into the mounting hole of the vehicle roof from the washer ring side and recovers to substantially the original opening state after insertion;
a leg opening preventing part configured to prevent the leg part from opening at a predetermined angle or more when the claws abut against the vehicle roof after fastening between the first threaded part and the second threaded part through the washer ring of the legged washer and having a horizontal part obtained by being cut from the leg part at a portion in the vicinity between the plurality of claws and being horizontally bent and a vertical part bent so as to extend vertically from the horizontal part; and
a receiving part provided in at least one of the first threaded part and the second threaded part and configured to receive the vertical part of the leg opening preventing part so as to limit the movement of the leg part in the opening direction thereof when the claws of the legged washer abut against the vehicle roof.

2. The roof-mount antenna mounting structure according to claim 1, wherein
the legged washer has a temporary fixing part for temporarily fixing the legged washer in such a degree that tips of the claws float from the vehicle roof after insertion of the legged washer into the mounting hole of the vehicle roof from the washer ring side and before fastening between the first threaded part and the second threaded part, and
at least one of the antenna base, the receiving part, the first threaded part, and the second threaded part has a locking part to which the temporary fixing part is locked.

3. The roof-mount antenna mounting structure according to claim 1, wherein
the washer ring of the legged washer has a bent part so as to prevent co-rotation of the legged washer when the first threaded part and the second threaded part are fastened together.

4. The roof-mount antenna mounting structure according to claim 1, further comprising
a fall preventing locking part to be locked to the mounting hole of the vehicle roof so as to prevent the legged washer from falling from the vehicle roof when an antenna is removed from the mounting hole of the vehicle roof.

5. The roof-mount antenna mounting structure according to claim 4, wherein
the fall preventing locking part is released from its locked state to the mounting hole of the vehicle roof when the leg opening preventing part is pressed in a direction closing the leg part of the legged washer.

6. The roof-mount antenna mounting structure according to claim 1, wherein
the through hole of the washer ring of the legged washer has an internal tooth part serving as a locking structure for the first threaded part or the second threaded part.

7. The roof-mount antenna mounting structure according to claim 1, wherein
the through hole of the washer ring of the legged washer has a potbelly shape formed by a combination of holes, one of which with an inner diameter larger than and the other of which with an inner diameter substantially the same as the diameter of the first threaded part or the second threaded part.

8. The roof-mount antenna mounting structure according to claim 1, wherein
the leg part of the legged washer has a reinforcing bent part so as to reinforce the leg part.

9. A roof-mount antenna mounting structure for fixing an antenna to a mounting hole of a vehicle roof, the roof-mount antenna mounting structure comprising:
a first threaded part provided so as to protrude from an antenna base to be disposed outside a vehicle interior and inserted into the mounting hole of the vehicle roof;
a second threaded part fastened to the first threaded part;
a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base, having a side bent part extending from the side of the leg part in the perpendicular direction, and having such elasticity that it closes once when the legged washer is inserted into the mounting hole of the vehicle roof from the washer ring side and recovers to substantially the original opening state after insertion;
a leg opening preventing part configured to prevent the leg part from opening at a predetermined angle or more when the claws abut against the vehicle roof after fastening between the first threaded part and the second threaded part through the washer ring of the legged washer and provided at the tip of the side bent part of the leg part; and
a receiving part provided in at least one of the first threaded part and the second threaded part and configured to receive a side end of the leg opening preventing part so as to limit the movement of the leg part in the opening direction thereof when the claws of the legged washer abut against the vehicle roof.

10. A roof-mount antenna mounting structure for fixing an antenna to a mounting hole of a vehicle roof, the roof-mount antenna mounting structure comprising:
a first threaded part provided so as to protrude from an antenna base to be disposed outside a vehicle interior and inserted into the mounting hole of the vehicle roof;
a second threaded part fastened to the first threaded part;
a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base, having a side bent part extending from the side of the leg part in the perpendicular direction, and having such elasticity that it closes once when the legged washer is inserted into the mounting hole of the vehicle roof from the washer ring side and recovers to substantially the original opening state after insertion;

a leg opening preventing part configured to prevent the leg part from opening at a predetermined angle or more when the claws abut against the vehicle roof after fastening between the first threaded part and the second threaded part through the washer ring of the legged washer and formed by slitting the side bent part and bending the slitted part; and a receiving part provided in at least one of the first threaded part and the second threaded part and configured to receive a side end of the leg opening preventing part so as to limit the movement of the leg part in the opening direction thereof when the claws of the legged washer abut against the vehicle roof.

11. A roof-mount antenna mounting structure for fixing an antenna to a mounting hole of a vehicle roof, the roof-mount antenna mounting structure comprising:

a first threaded part provided so as to protrude from an antenna base to be disposed outside a vehicle interior and inserted into the mounting hole of the vehicle roof;

a second threaded part fastened to the first threaded part;

a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base and having such elasticity that it closes once when the legged washer is inserted into the mounting hole of the vehicle roof from the washer ring side and recovers to substantially the original opening state after insertion;

a leg opening preventing part configured to prevent the leg part from opening at a predetermined angle or more when the claws abut against the vehicle roof after fastening between the first threaded part and the second threaded part through the washer ring of the legged washer;

a receiving part provided in at least one of the first threaded part and the second threaded part and configured to receive the vertical part of the leg opening preventing part so as to limit the movement of the leg part in the opening direction thereof when the claws of the legged washer abut against the vehicle roof;

a temporary fixing part for temporarily fixing the legged washer in such a degree that tips of the claws float from the vehicle roof after insertion of the legged washer into the mounting hole of the vehicle roof from the washer ring side and before fastening between the first threaded part and the second threaded part; and a locking part provided in at least one of the antenna base, the receiving part, the first threaded part, and the second threaded part, to which the temporary fixing part is locked.

12. The roof-mount antenna mounting structure according to claim 11, wherein the temporary fixing part is provided in the leg opening preventing part.

13. The roof-mount antenna mounting structure according to claim 12, wherein the leg opening preventing part is configured such that, when the first threaded part and the second threaded part are fastened through the washer ring, the temporary fixing part is displaced in the fastening direction to come off from the locking part, which allows the leg opening preventing part to be pressed in a direction preventing the leg part from opening at a predetermined angle or more.

14. A roof-mount antenna mounting structure for fixing an antenna to a mounting hole of a vehicle roof, the roof-mount antenna mounting structure comprising:

a first threaded part provided so as to protrude from an antenna base to be disposed outside a vehicle interior and inserted into the mounting hole of the vehicle roof;

a second threaded part fastened to the first threaded part;

a conductive plate shaped legged washer including a washer ring having a through hole through which the first threaded part or the second threaded part penetrates and having a size smaller than the diameter of the mounting hole of the vehicle roof, and a leg part extending from the washer ring and having claws abutting against the vehicle roof, the leg part having a flare shape opening with a size larger than the diameter of the mounting hole of the vehicle roof from the washer ring toward the antenna base and having such elasticity that it closes once when the legged washer is inserted into the mounting hole of the vehicle roof from the washer ring side and recovers to substantially the original opening state after insertion;

a temporary fixing part for temporarily fixing the legged washer in such a degree that tips of the claws float from the vehicle roof after insertion of the legged washer into the mounting hole of the vehicle roof from the washer ring side and before fastening between the first threaded part and the second threaded part; and a locking part provided in at least one of the antenna base, first threaded part, and second threaded part, to which the temporary fixing part is locked.

15. The roof-mount antenna mounting structure according to claim 14, wherein the washer ring of the legged washer has a bent part so as to prevent ca-rotation of the legged washer when the first threaded part and the second threaded part are fastened together, and the temporary fixing part is provided in the bent part.

* * * * *